United States Patent
Wodrich

(10) Patent No.: US 9,623,921 B2
(45) Date of Patent: Apr. 18, 2017

(54) NON-CARBURIZED COMPONENTS OF TRACK-TYPE MACHINES HAVING A METALLURGICALLY BONDED COATING

(71) Applicant: Deere & Company, Moline, IL (US)

(72) Inventor: Timothy D. Wodrich, Peosta, IA (US)

(73) Assignee: DEERE & COMPANY, Moline, IL (US)

( * ) Notice: Subject to any disclaimer, the term of this patent is extended or adjusted under 35 U.S.C. 154(b) by 604 days.

(21) Appl. No.: 14/134,381

(22) Filed: Dec. 19, 2013

(65) Prior Publication Data

US 2014/0103703 A1 Apr. 17, 2014

Related U.S. Application Data

(60) Division of application No. 12/495,271, filed on Jun. 30, 2009, which is a continuation-in-part of
(Continued)

(51) Int. Cl.
*B62D 55/21* (2006.01)
*B22D 19/08* (2006.01)
(Continued)

(52) U.S. Cl.
CPC ............ *B62D 55/21* (2013.01); *B22D 19/08* (2013.01); *B62D 55/12* (2013.01); *B62D 55/14* (2013.01);
(Continued)

(58) Field of Classification Search
CPC .. B62D 55/205; B62D 55/21; B62D 55/0887; B62D 55/202
(Continued)

(56) References Cited

U.S. PATENT DOCUMENTS 2,334,350 A 11/1943 Neuhaus
3,310,870 A 3/1967 Parikh et al.
(Continued)

FOREIGN PATENT DOCUMENTS

EP 0 302 988 A1 2/1989
EP 0 459 637 A1 12/1991
(Continued)

OTHER PUBLICATIONS

Louis R. Hathaway, Ed., *Tires and Tracks, Fundamentals of Service*, John Deere Service Training Manual, Deere and Company, Moline, IL, 1986, pp. 47-67.
(Continued)

*Primary Examiner* — Jason Bellinger
(74) *Attorney, Agent, or Firm* — Buchanan Ingersoll & Rooney PC

(57) ABSTRACT

Undercarriage assembly components of track-type machines having a metallurgically bonded wear-resistant coating and methods for forming such coated undercarriage assembly components is taught herein. The bodies of the undercarriage assembly components, formed of an iron-based alloy, have a hard metal alloy slurry disposed on a surface or into an undercut or channel and then fused to form a metallurgical bond with the iron-based alloy. The wear-resistant coating comprises a fused, metal alloy comprising at least 60% iron, cobalt, nickel, or alloys thereof. The portion of the outer surface of the undercarriage assembly components having the wear-resistant coating corresponds to a wear surface of the component during operation of the endless track of the track-type vehicle.

7 Claims, 10 Drawing Sheets

Related U.S. Application Data application No. 11/171,193, filed on Jul. 1, 2005, now Pat. No. 8,684,475, which is a continuation-in-part of application No. 10/090,617, filed on Mar. 6, 2002, now Pat. No. 6,948,784.

(51) Int. Cl.

| | | |
|---|---|---|
| *B62D 55/12* | (2006.01) | |
| *B62D 55/14* | (2006.01) | |
| *B62D 55/15* | (2006.01) | |
| *B62D 55/20* | (2006.01) | |
| *B62D 55/32* | (2006.01) | |
| *C23C 24/08* | (2006.01) | |
| *C23C 26/00* | (2006.01) | |
| *C23C 30/00* | (2006.01) | |

(52) U.S. Cl.
CPC ............ *B62D 55/15* (2013.01); *B62D 55/20* (2013.01); *B62D 55/202* (2013.01); *B62D 55/32* (2013.01); *C23C 24/08* (2013.01); *C23C 26/00* (2013.01); *C23C 30/00* (2013.01); *Y10T 29/49885* (2015.01)

(58) Field of Classification Search
USPC .............................. 305/103–105, 194, 202
See application file for complete search history.

(56) References Cited

U.S. PATENT DOCUMENTS

| | | | |
|---|---|---|---|
| RE27,851 E | 12/1973 | Alessi et al. | |
| 4,042,282 A | 8/1977 | Haslett et al. | |
| 4,175,163 A | 11/1979 | Ikeno et al. | |
| 4,182,394 A | 1/1980 | Cason, Jr. | |
| 4,218,494 A | 8/1980 | Belmondo et al. | |
| 4,625,810 A | 12/1986 | Edmisson | |
| 4,626,464 A | 12/1986 | Jachowski et al. | |
| 4,629,353 A | 12/1986 | Burke | |
| 4,682,987 A | 7/1987 | Brady et al. | |
| 4,776,566 A | 10/1988 | Girdley | |
| 4,930,675 A | 6/1990 | Bedford et al. | |
| 4,954,058 A | 9/1990 | Revankar | |
| 5,027,878 A | 7/1991 | Revankar et al. | |
| 5,126,104 A | 6/1992 | Anand et al. | |
| 5,249,868 A | 10/1993 | Watts | |
| 5,267,600 A | 12/1993 | Revankar | |
| 5,288,353 A | 2/1994 | Revankar | |
| 5,299,620 A | 4/1994 | Revankar et al. | |
| 5,383,513 A | 1/1995 | Revankar | |
| 5,443,916 A | 8/1995 | Revankar | |
| 5,456,323 A | 10/1995 | Hill | |
| 5,647,920 A | 7/1997 | Sasaki et al. | |
| 5,702,667 A | 12/1997 | Pond | |
| 5,879,743 A | 3/1999 | Revankar | |
| 6,045,200 A | 4/2000 | Anderton et al. | |
| 6,074,022 A | 6/2000 | Anderton et al. | |
| 6,089,683 A | 7/2000 | Anderton et al. | |
| 6,145,941 A | 11/2000 | Anderton et al. | |
| 6,402,862 B1 | 6/2002 | Anderton et al. | |
| 6,414,258 B1 | 7/2002 | Amano | |
| 6,485,116 B1 | 11/2002 | Oertley | |
| 6,565,161 B2 | 5/2003 | Anderton | |
| 6,666,013 B2 | 12/2003 | Nakagawa et al. | |
| 6,948,784 B2 | 9/2005 | Wodrich et al. | |
| 8,684,475 B2 * | 4/2014 | Wodrich ................ | B62D 55/12 305/194 |
| 2006/1001732 | 1/2006 | Wodrich et al. | |
| 2010/0007206 A1 * | 1/2010 | Wodrich ................ | B22D 19/08 305/198 |

FOREIGN PATENT DOCUMENTS

| | | |
|---|---|---|
| EP | 1 342 651 A2 | 9/2003 |
| GB | 1 572 963 | 8/1980 |
| JP | 60-89503 | 5/1985 |
| JP | 60-89504 | 5/1985 |
| JP | 2000-343219 | 12/2000 |

OTHER PUBLICATIONS

European Search Report dated Sep. 6, 2011 for European Patent Application No. 10 16 5515.

Partial European Search Report dated Sep. 15, 2011 for European Patent Application No. 10 16 8036.

* cited by examiner

NON-CARBURIZED COMPONENTS OF TRACK-TYPE MACHINES HAVING A METALLURGICALLY BONDED COATING

This application is a divisional of U.S. Ser. No. 12/495,271, filed Jun. 30, 2009, which is a continuation-in-part of U.S. Ser. No. 11/171,193, filed Jul. 1, 2005, now U.S. Pat. No. 8,684,475, which is a continuation-in-part of U.S. Ser. No. 10/090,617, filed Mar. 6, 2002, now U.S. Pat. No. 6,948,784, the entire contents of which are incorporated herein by reference thereto.

BACKGROUND OF THE INVENTION

Field of the Invention

The present disclosure relates generally to components of track-type machines, such as track chain bottom rollers, track chain links, track pin bushings, track pins and track pin bushing joints, which are made of non-carburized steel having a wear-resistant coating metallurgically bonded thereto. In particular, it relates to undercarriage assembly components and other components of track-type machines that are made of non-carburized steel and that have a wear resistant coating that is metallurgically bonded to portions of the component subject to wear, such as portions of the bottom roller, surfaces where the track chain link engages and disengages, an outside diameter surface of a track pin bushing where a drive sprocket engages and disengages the surface, an inside diameter surface of the track pin bushing, and a hinge pin bushing where two machine members are hinged together, and the outside diameter surface of the pin in the track pin bushing and the hinged pin joint.

Description of Related Art

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

An endless track is a chain made up of links, track pin bushings, track pins, bottom rollers and shoes. FIG. 1 shows these undercarriage assembly components in a representative section of a track on a track-type machine, i.e., a crawler tractor. Each section of the track is a pair of links fastened together with a track pin bushing at one end and a track pin at the other end. The track pin fits inside the bushing to hold the next pair of links. Both the track pin and the track pin bushing are typically "press fit" into the links so the section does not work apart during the service life of the track. One track pin on each track, the so-called master pin, is held in by a snap ring to allow removal and separation of the track, for example, when performing repairs or maintenance of the track. A track shoe, having a desired grip or grouser determined by the environment of intended use (e.g., clay, slit, loam, gravel, snow, mud, or hard surfaces) is bolted to each section to provide traction.

The undercarriage assembly components of track-type machines, such as track chain bottom rollers, track chain links, track pin bushings, track pins and track pin bushing joints in endless tracks of a track-type machine are subjected to very severe operating environments. For example, debris, soil, rocks and so forth can enter the track and undercarriage of a track-type machine, such as a crawler tractor, during operation. These materials can subsequently accumulate between the engaging surfaces of the undercarriage assembly components and engaging surfaces of the drive equipment, pack into the area between them and/or directly grind, wear, pit, scratch or crack the surface of the undercarriage assembly components. A track that is adjusted too tight can increase friction and cause accelerated wear to undercarriage assembly components, such as track pins and track pin bushings. In an extreme case, severely tight track adjustment can cause the track to run extremely hot and "draw-back" the hardness of undercarriage assembly components, such as track pins and track pin bushings, i.e., heat treat the components resulting in a reduction in the components' hardness, and even cause the track pins and track pin bushings to fuse together. At the other end of the spectrum, a too loose track can allow drive sprocket teeth to jump links, especially in reverse, causing wear to undercarriage assembly components such as the teeth and the track pin bushings, bottom rollers, and so forth.

Undercarriage assembly components are subject to wear. For example, there are two types of wear on track pins and track pin bushings—external wear and internal wear. External wear takes place on the outer diameter of the track pin bushings in the area contacted by the drive sprocket teeth. This contact area is about ⅓ or more of the surface of the track pin bushing and occupies the majority of the center length of the track pin bushing. Wear occurs on the outside diameter of the track pin and the inside diameter of the track pin bushing. Additionally, where the track pin bushings are fitted into the track link counterbores, internal wear can occur on the outside diameter of the ends of the track pin bushings. Thus, current track pins and track pin bushings in endless tracks experience wear and stress which can negatively impact the service life of the track pin bushing.

Current track pins and track pin bushings are typically formed from materials that are hardened to decrease wear and increase service life. For example, current track pins are case hardened by carburizing the alloy and then quenching. However, these materials and methods still result in a relatively short service life. Thus, in addition to material selection for hardness and wear resistance, current track pins and track pin bushings are either turned or replaced to present a new wear surface to the sprocket and consequently extend service life. See, for example, Louis R. Hathaway, Ed., "Tires and Tracks, Fundamentals of Service", Moline, Ill.: Deere and Company, 1986, pp. 47-67. However, the track pins and track pin bushings must be turned prior to being worn past the wear limit, or they will not be serviceable. Thus, frequent inspection and maintenance of track pins and track pin bushings occurs to identify and ameliorate components that have worn, resulting in the associated down time of equipment and personnel.

In addition, other pin/bushing (P/B) joints are widely used as hinges between two machine members in various types of machinery such as heavy equipment including tractors, construction, forestry and mining equipment. The P/B joint while serving as a hinge is also required to serve as a loaded bearing during relative motion between the two machine members connected to the joint. Such a joint, by virtue of its location on the machine and depending on the type of machine, is exposed to a dusty environment. The dust from this environment, which is mostly fine sand particles, enters into the space between the pin and the bushing and causes accelerated wear of the pin and the bushing mating surfaces and thus reduces the joint life. This then makes it necessary to replace the joint frequently even with frequent daily or weekly changing of the lubricant. The accelerated wear due to sand particles is due to the higher hardness of sand as compared to the hardness of the pin and bushing surfaces.

In conventional track/pin bushings, mating surfaces, which are the outer surface of the pin and the bore surface of the bushing, are case carburized and the parts are then quenched and tempered to obtain a high hardness on the surfaces. These high-hardness surfaces are more resistant to abrasion by fine sand particles (which travel from the outside environment into the clearance between the pin and the bushing) than if they were not carburized. This leads to a longer life of the P/B joint. However, the surface hardness obtained by this method of carburizing and quenching is only about 60-62 HRC which is much less than the hardness of the sand particles and therefore the technique provides only a limited P/B wear protection and life extension. The sand particles which enter into the clearance space between the pin and the bushing get mixed with the lubricating grease (which is injected into the clearance) and the effectiveness of the grease gradually diminishes. This makes it necessary to force out the grease from the joint clearance space frequently, sometimes daily, depending on the degree of joint seal effectiveness, and the environment in which the machine is working, to get the sand out of the joint. This frequent purging of grease helps increase the joint life to some extent. Nevertheless, this purging operation, if required to be done frequently, becomes time consuming and wasteful.

Other current undercarriage assembly components are typically formed from materials that are hardened to decrease wear and increase service life. For example, current bottom rollers are hardened by quenching. However, these materials and methods still result in a relatively short service life. The wear problem is aggravated because sand is much harder than even the hardened steel and wear of the bottom roller cannot be substantially reduced by simply hardening the contact surface. Thus, frequent inspection and maintenance of bottom rollers occurs to identify and ameliorate components that have worn, resulting in the associated down time of equipment and personnel. Similar efforts with similar limited results are known for other undercarriage assembly components.

Also, for example, undercarriage track chain links that form a part of the undercarriage assembly are subjected to severe wear and corrosion. Wear is caused by continuous contact with undercarriage rollers which themselves are hardened. The wear rate is enhanced due to abrasive action of dry sand and wet sand slurry and other hard materials such as rocks, trapped between the link and roller contact surfaces. The wear problem is further aggravated due to the fact that sand is much harder than even the hardened steel, and wear of links cannot be substantially reduced by simply hardening the contact surface. Therefore a solution other than heat treatment is required to reduce wear rate to prolong the life of the link substantially.

Also, due to the functional nature of the crawler and other construction and mining equipment, the undercarriage parts of these machines are required to be in intimate contact with wet sand and mud continuously. This causes the link surfaces to corrode, thus producing a synergistic effect on wear. This corrosion cannot be reduced by hardening the steel. Any other superficial surface treatment of links, such as carburizing, nitriding or other conventional surface treatment methods, are not cost effective against the wear- and corrosion-indicated that environment that the links face during service. A more expensive material, such as a highly alloyed steel or other advanced material, therefore does not constitute used since such a substitution would substantially increase cost and cannot be an acceptable solution.

A solution to the problem which can reduce both wear and corrosion and also which can be applied in a production environment and at a low cost, is required.

A change in the current manufacturing process of components is proposed. The current method involves hot forging medium carbon steel containing various amounts of boron, manganese, chromium and others, machining mating surface and induction hardening select surfaces.

Coating a metal surface with another metal or metal alloy to enhance appearance, protect against corrosion, or improve resistance to wear is often referred to as "hardfacing" or "hard surfacing." For example, see Alessi U.S. Pat. No. Re. 27,851, Revankar U.S. Pat. No. 5,027,878 and U.S. Pat. No. 5,443,916, Brady, et al., U.S. Pat. No. 4,682,987, and Hill U.S. Pat. No. 5,456,323.

Hardfacing is often done by fusing a powdered, hard metal alloy onto a metal surface. In endless track applications, metal parts subject to wear can be case hardened to improve wear resistance. However, application of current wear-resistant coatings prior to carburizing results in oxidation of the wear-resistant coating during subsequent carburizing with an adverse impact on the wear-resistant properties of the coating.

Accordingly, longer wearing surfaces on undercarriage assembly components of endless tracks used in track-type machines, such as track pin bushings, are desired to extend the service life and to reduce the long-term maintenance cost associated with endless tracks. Further, a method of producing such a longer wearing surface by coating with a wear-resistant alloy while still obtaining a desired wear resistance of the uncoated portions of the component by other suitable means, i.e., case hardening, and in particular, by induction hardening is desirable.

Also, due to the functional nature of the heavy machinery construction, mining and forestry type equipment, the components, both the undercarriage assembly components and the hinge joint components, of these machines are required to be in intimate contact with wet sand and mud continuously during the machine operation. This causes components such as the bottom roller surfaces to corrode, thus producing a synergistic effect on wear due to abrasion. This corrosion cannot be reduced by hardening the steel. Any other superficial surface treatment of bottom rollers such as carburizing, nitriding or other conventional surface treatment methods are not cost effective or adequate against a highly wear- and corrosion-prone environment which the bottom rollers face during service. A more expensive material such as a highly alloyed steel or other advanced material, cannot be used since such a substitution would substantially increase cost without a corresponding increase in performance, and cannot be an acceptable solution.

A solution to the problem which can reduce both wear and corrosion and also which can be applied in a production environment and at a low cost is required.

U.S. Pat. No. 6,414,258 discloses a method of applying beads of hard material to sprocket teeth and bushings of a base carrier for a tracklaying vehicle. In this method, the beads are applied sequentially by weld overlays (an obviously slow process) and produce a sinusoidal type surface which is detrimental to the mating part such as the chain link. Because of the bead nature of the deposit, it takes a substantial time to generate a smoother surface by initial wear. Before this smooth wear surface is produced, the deposited contact surface can cause damage to the mating link surface.

SUMMARY

The method and apparatus disclosed herein avoid or alleviate some or all of the problems of the prior art described above.

It is further an object of this invention to provide a wear-resistant coating on at least a track chain bushing, pin, roller, or other part of an undercarriage track chain.

In one aspect of the invention, there is provided a track pin bushing for cooperating with a track pin in an endless track, the track pin bushing comprising:
  a tubular body formed of non-carburized iron-based alloy with a first end and a second end, an outer surface that is case-hardened in at least a section thereof, and an inner surface having an inner diameter, wherein the inner diameter defines the circumference of an axial bore extending from the first end to the second end; and
  a wear-resistant coating metallurgically bonded to said non-carburized iron absorbed alloy prior to formation of said case-hardened outer surface, the wear-resistant coating comprising a fused, hard metal alloy comprising at least 60% iron, cobalt, nickel, or alloys thereof. Desirably, the metallurgically bonded wear-resistant coating has a Vickers Hardness greater than 950 HV, more particularly, a Vickers Hardness of 950 HV to 1250 HV.

In a second embodiment, there is provided a track pin bushing for cooperating with a track pin in an endless track, the track pin bushing comprising:
  a first end and a second end;
  an inner surface having an inner diameter, wherein the inner diameter defines the circumference of an axial bore extending from the first end to the second end;
  an outer surface having an outer diameter; at a first end section and a second end section and a second outer diameter at a middle section therebetween, wherein the second outer diameter is greater than the first outer diameter;
    a wear-resistant coating disposed on said inner surface, said outer surface, or both and metallurgically bonded to the non-carburized iron-based alloy, the wear-resistant coating comprising a fused, hard metal alloy comprising at least 60% iron, cobalt, nickel, or alloys thereof and having a Vickers Hardness greater than 950 HV.

In a further aspect of the invention, there is provided a method for hardfacing with a wear-resistant coating a metal surface of a non-carburized metal part, the method comprising the steps of:
  coating at least a portion of a surface of said non-carburized metal part with a slurry comprising a fusible, hard metal alloy with at least 60% iron, cobalt, nickel, or alloys thereof in the form of a finely divided powder, polyvinyl alcohol, a suspension agent and a deflocculant; and
  forming a metallurgical bond between the area and the coated slurry to form the wear-resistant coating. The non-carburized metal part may be through-hardened, induction hardened, or a combination of both.

In a second embodiment, there is provided a method for hardfacing a metal surface of a non-carburized track pin bushing with a wear-resistant coating, the track pin bushing comprising an outer surface having an outer diameter, an inner surface having an inner diameter, a first end and a second end, wherein the inner diameter defines the circumference of an axial bore extending from the first end to the second end and cooperating with a track pin in an endless track, the method comprising
  coating an exposed layer of the noncarburized track pin bushing with a slurry comprising a fusible, hard metal alloy with at least 60% iron, cobalt, nickel, or alloys thereof in the form of a finely divided powder, polyvinyl alcohol, a suspension agent and a deflocculant;
  forming the wear-resistant coating by metallurgically bonding the exposed layer of the noncarburized track pin and fused, hard metallurgically in the slurry; and
  case hardening the track pin bushing by induction hardening.

In an additional embodiment, there is provided a method for hardfacing a metal surface of a track pin bushing with a wear-resistant coating, the method comprising:
  forming the track pin bushing having a first end and a second end, an inner surface having an inner diameter, wherein the inner diameter defines the circumference of an axial bore extending from the first end to the second end, an outer surface having a first outer diameter at a first end section and a second end section and a second outer diameter at a middle section therebetween, the second outer diameter being greater than the first outer diameter from non-carburized steel;
  coating said inner surface, said outer surface, or both with a slurry comprising a fusible, hard metal alloy with at least 60% iron, cobalt, nickel, or alloys thereof in the form of a finely divided powder, polyvinyl alcohol, a suspension agent and a deflocculant;
  adjusting a thickness of the slurry to have an outer surface that is concentric with the axial bore, wherein the thickness of the concentric outer surface is from 1.67 to 2.0 times a final thickness of the wear-resistant coating;
  forming the wear-resistant coating by metallurgically bonding said hard metal alloy in said slurry; and
  case hardening at least the inner diameter and first and second ends.

In an additional aspect of the invention, there is provided a track pin bushing in combination with a track pin for connecting adjacent track links in an endless track of a crawler track, the track pin bushing including an axial bore therethrough in which is positioned the track pin, the track pin bushing comprising:
  a tubular body formed of a non-carburized case hardened iron-based alloy with a first end and a second end, an outer surface, and an inner surface having an inner diameter, wherein the inner diameter defines the circumference of the axial bore extending from the first end to the second end; and
  a wear-resistant coating metallurgically bonded to said outer surface, the wear-resistant coating comprising a fused, hard metal alloy comprising at least 60% iron, cobalt, nickel, or alloys thereof.

In another aspect of the invention, there is provided a pin bushing joint of an endless track of a track-type machine, the pin bushing joint comprising:
a bushing comprising a non-carburized steel including an outer surface having an outer diameter and including an inner surface having an inner diameter; and
a track pin comprising a non-carburized steel and including an outer surface, wherein a portion of the outer surface of the track pin substantially conforms to a portion of the inner surface of the bushing to form a wear surface, and wherein the wear surface has a metallurgically bonded, wear-resistant coating, the wear-resistant coating comprising a fused hard metal alloy comprising at least 60% by weight iron, cobalt, nickel or alloys thereof.

In still another aspect of the invention, there is provided a method of making a pin bushing joint, the method comprising:
forming a bushing including an outer surface having an outer diameter and including an inner surface having an inner diameter;
forming a track pin including an outer surface substantially conforming to a portion of the inner surface of the bushing to form a wear surface;
wherein both of bushing and the track pin comprise non-carburized steel;
coating the inner surface of the bushing and the outer surface of the track pin with a slurry comprising a fusible, hard metal alloy with at least 60% by weight of iron, cobalt, nickel or alloys thereof in the form of a finely divided powder, polyvinyl alcohol, a suspension agent and a deflocculant; and
forming a metallurgical bond between the bushing, track pin, and the hard metal alloy in said coating slurry to form a wear-resistant coating.

In a further aspect of the invention, there is provided an undercarriage track chain bottom roller comprising:
at least one cylindrical portion comprising non-carburized steel;
and at least one flange of greater diameter than said at least one cylindrical portion and comprising non-carburized steel;
at least a portion of said at least one cylindrical portion and said at least one flange portion being subjected to wear;
said portions being subjected to wear having a metallurgically bonded, wear-resistant coating;
said wear-resistant coating comprising a fused hard metal alloy comprising at least 60% by weight iron, cobalt, nickel or alloys thereof.

In a still further aspect of the invention, there is provided a method for making an undercarriage track chain bottom roller comprising:
forming a roll body having at least one cylindrical portion and at least one flange portion;
removing the outer surface of those portions of the said cylindrical and flange portions subject to wear to expose an area of the roller body to be coated;
coating one or more surfaces of said cylindrical portion and/or said flange portion with a slurry comprising a fusible, hard metal alloy with at least 60% by weight of iron, cobalt, nickel or alloys thereof in the form of a finely divided powder, polyvinyl alcohol, a suspension agent and a deflocculant; and
forming a metallurgical bond between the exposed area and the hard metal alloy in said coating slurry to form a wear-resistant coating.

In another aspect of the invention, there is provided a track chain link of an endless track of a track-type machine comprising:
a body formed of non-carburized hardened steel;
a mounting surface on a first edge of the body, the mounting surface including at least one opening for an attachment device; and
a contact surface on a second edge of the body,
wherein the contact surface is opposite the mounting surface,
wherein the contact surface includes a substantially planar region extending a distance along the second edge forming a wear surface, and wherein the wear surface has a metallurgically bonded, wear-resistant coating, the wear-resistant coating comprising a fused hard metal alloy comprising at least 60% by weight iron, cobalt, nickel or alloys thereof.

In still another aspect of the invention, there is provided a method of making a track chain link, the method comprising:
forming the track chain link, the track chain link including a body comprising non-carburized steel, a mounting surface on a first edge of the body, and a contact surface on a second edge of the body, wherein the mounting surface includes at least one opening for an attachment device, the contact surface includes a substantially planar region extending a distance along the second edge forming a wear surface, and the contact surface is opposite the mounting surface;
coating at least a portion of the wear surface of the track chain link with a slurry comprising a fusible, hard metal alloy with at least 60% by weight of iron, cobalt, nickel or alloys thereof in the form of a finely divided powder, polyvinyl alcohol, a suspension agent and a deflocculant; and
forming a metallurgical bond between the coated area and the hard metal alloy in said coating slurry to form a wear-resistant coating.

Desirably, the parts to be coated as described above are formed from non-carburized, medium carbon alloy steel. Such a procedure avoids the need to (a) carburize the steel part prior to coating, and (b) remove a portion of the resulting high carbon steel surface to allow adequate metallurgical bonding to the coating, as is described in U.S. Pat. No. 6,948,784. This results in a more streamlined, more efficient, lower cost production process, while still producing parts with desirable and acceptable properties. Desirably, the wear-resistance coating has a Vickers Hardness of greater than 950 HV, more particularly, from 950 HV to 1250 HV.

Following metallurgical bonding of the wear-resistant coating, the part can be through-hardened and/or case hardened by induction hardening using techniques known in the art. The resulting induction hardening produces a wear-resistant layer of steel having a hardness of 55-60 HRC over the surface of the part, and in a layer below the metallurgically bonded wear-resistant coating.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS

Figure 2:
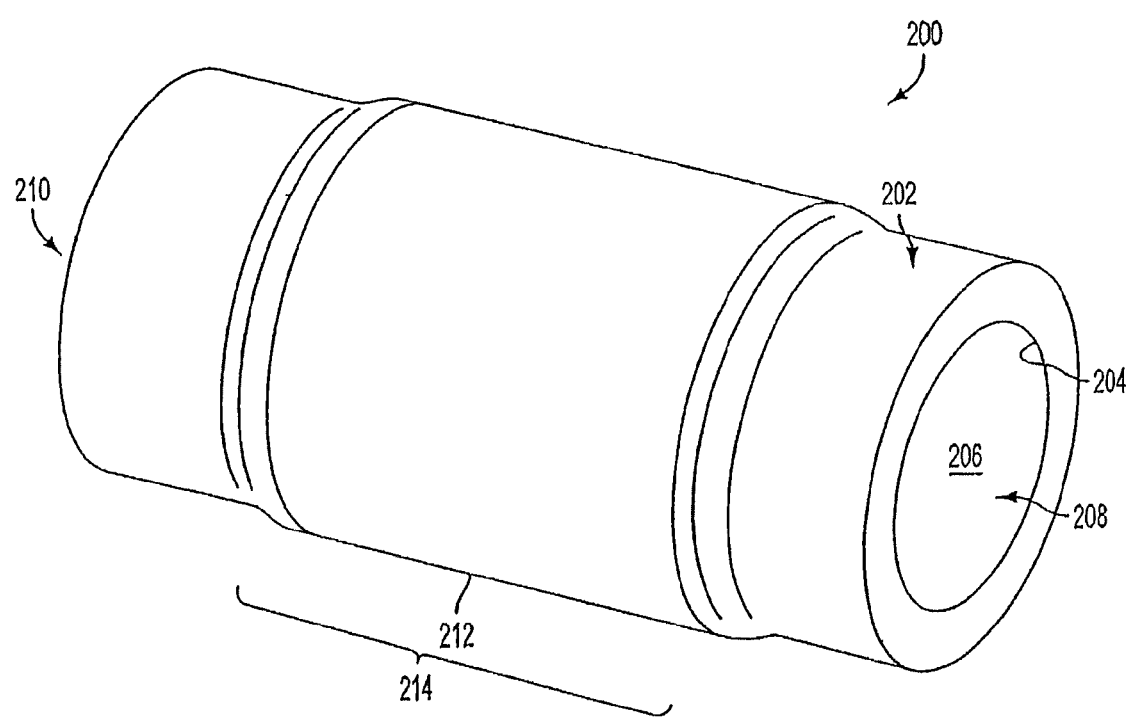
FIG. 2 shows a schematic perspective view of a track pin bushing.

In an exemplary embodiment, the undercarriage assembly component having a metallurgically bonded wear resistant coating is a track pin bushing. A track pin bushing cooperates with a track pin in an endless track of a track-type machine, such as a crawler tractor. In an exemplary embodiment and as shown in FIG. 2, the track pin bushing 200 has a tubular body formed of non-carburized iron-based alloy, at least a section of which is case hardened, i.e., the outer surface, the inner surface, the ends, or portions or combinations thereof have been hardened following coating of at least a part of the surface. The track pin bushing 200 has an outer surface 202 having an outer diameter and an inner surface 204 having an inner diameter. The inner diameter defines the circumference of an axial bore 206 extending from the first end 208 to the second end 210 of the track pin bushing 200. A wear-resistant coating 212 is disposed on and metallurgically bonded to a portion 214 of the track pin bushing 200. This wear-resistant coating has been applied prior to hardening, so that the coating is applied to a non-carburized surface of the iron-based alloy.

Figure 3A:
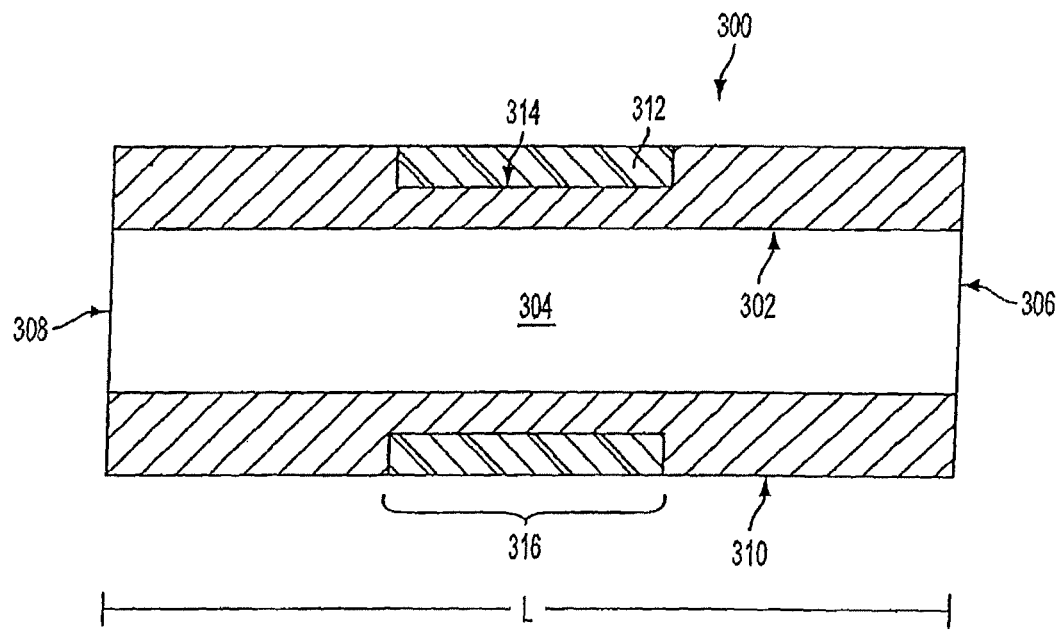
FIGS. 3A-B shows a schematic axial cross-section of A) a hardfaced track pin bushing with an uniform outer diameter along its length and B) a hardfaced track pin bushing with an increased radius at a central portion.

In an exemplary embodiment, a hardfaced track pin bushing has an outer surface with a uniform, i.e., non-varying, outer diameter. At least a portion of the outer surface has been case hardened, e.g., induction hardened, following coating with a wear-resistant coating. As shown in FIG. 3A, the track pin bushing 300 has an inner surface 302 having an inner diameter that defines the circumference of an axial bore 304 extending from the first end 306 to the second end 308 of the track pin bushing 300. An outer surface 310 has an outer diameter that is uniform along the axial length L of the track pin bushing 300. A wear-resistant coating 312 is metallurgically bonded to a non-carburized surface 314.

Figure 3B:
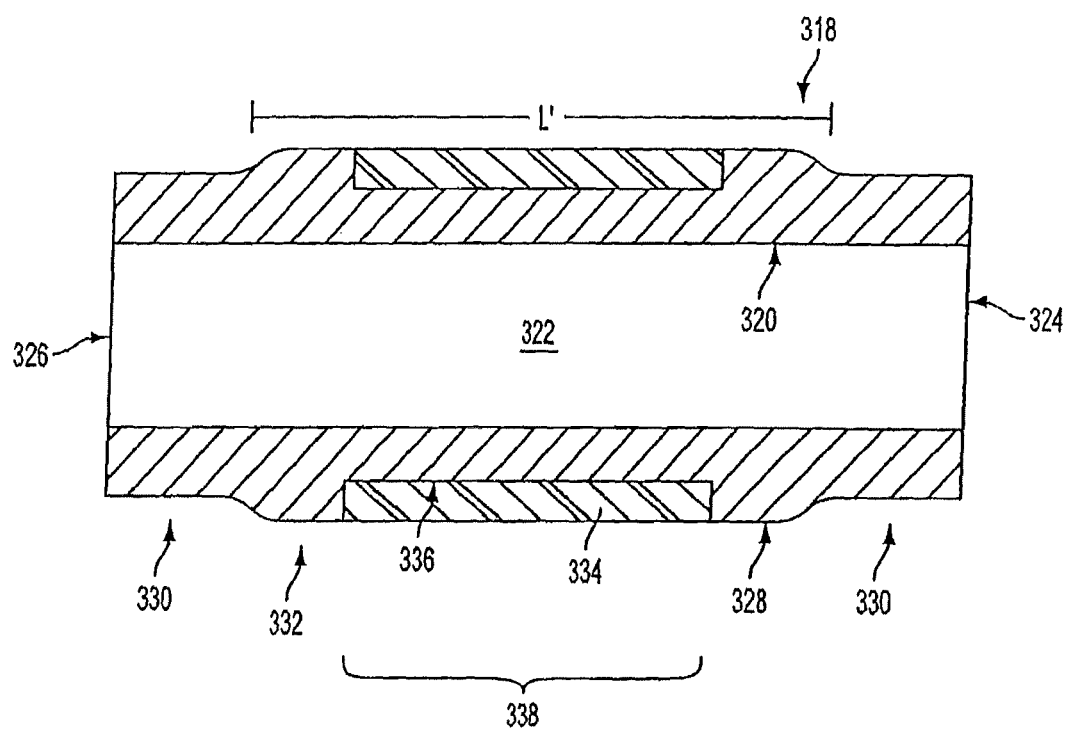

In another exemplary embodiment, a hardfaced track pin bushing has an outer surface with a nonuniform, i.e., varying, outer diameter. At least a portion of the outer surface has been case hardened, e.g., induction hardened. As shown in FIG. 3B, the track pin bushing 318 has an inner surface 320 having an inner diameter that defines the circumference of an axial bore 322 extending from the first end 324 to the second end 326 of the track pin bushing 318. An outer surface 328 has at least one first section 330 with a first outer diameter and at least one second section 332 with a second outer diameter. In the embodiment as shown, the second section 332 is a central portion between first sections 330 which are located at both the first end 324 and the second end 326. The second outer diameter is greater than the first outer diameter resulting in the second section 332 protruding from the track pin bushing 318 over an axial length L'. A wear-resistant coating 334 is disposed on and metallurgically bonded to a non-carburized layer 336 in at least a portion 338 of the second section 332.

In both the embodiments having a uniform outer diameter and having a nonuniform outer diameter, the exposed non-carburized layer 314, 336 and thus the wear-resistant coating 312, 334 disposed therein and bonded thereto, extends over a portion of the outer surface 310, 328 that corresponds to at least the contact surface adapted to engage with a drive sprocket in the endless track of a track-type machine. In the exemplary embodiments shown, the exposed layer 314, 336 is formed in an annular groove or other well or cavity-like feature in the surface of the piece, so that the coated surface is flush with the non-coated surface. However, the coated layer need not be limited to such a groove or well, and can be any shape or form as long as the coated portion of the device contains a non-carburized surface to which the wear-resistant coating can fuse by a metallurgical bond. For example, as described herein, the coating can be applied to a grooved surface or a well that has been formed in a non-carburized metal piece, or can be formed over the entire surface of the non-carburized metal piece. Either approach can provide a coated surface without significant ridges or other discontinuities, i.e., can provide a smooth surface, without the need to carburize, then remove carburized material to form a groove or well, then coat the uncarburized layer, if such a smooth surface is desired.

In one aspect and in an application for a crawler tractor designated as John Deere 850C Series II Crawler, the wear-resistant coating extends over a majority of an axial length of the track pin bushing. In other aspects, the wear-resistant coating extends over an axial length corresponding to the contact surface for the particular application, i.e. for the particular track-type machine, and may be a minority length, an end or plurality of ends, a groove or plurality of grooves, and so forth, as readily discernible by those of ordinary skill in the art.

In a further aspect, the wear-resistant coating has an outer surface flush with the outer surface of the track pin bushing, as shown in FIG. 3A. In alternative aspects, the wear-resistant coating has an outer surface that is not flush with the outer surface but extends beyond the outer surface to provide a raised coating or recedes into the outer surface to provide a recessed coating. The thickness of the wear resistant coating determines the wear life of the track pin bushing and can be any desired thickness, with a thicker coating promoting a longer wear life. In an exemplary embodiment, the wear-resistant coating has a thickness of approximately 1-2 mm.

Figure 4:
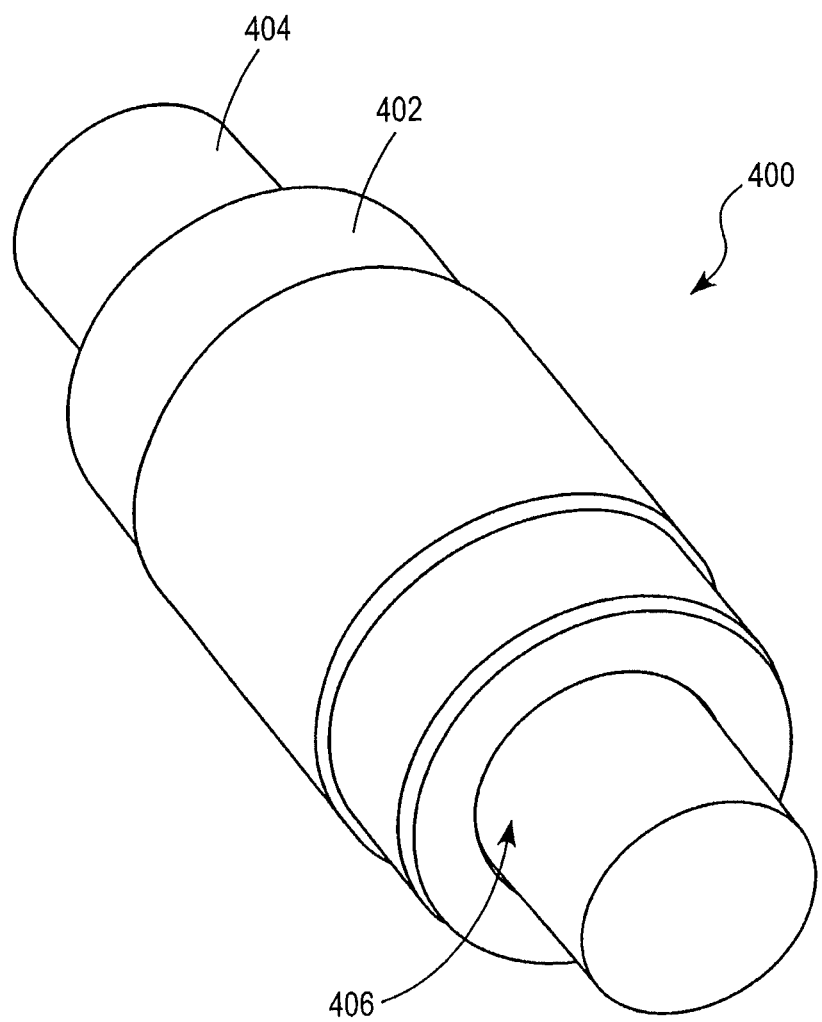
FIG. 4 shows a schematic perspective view of an assembled pin bushing joint including a track pin bushing with a track pin inserted in the bore.
Figure 5:
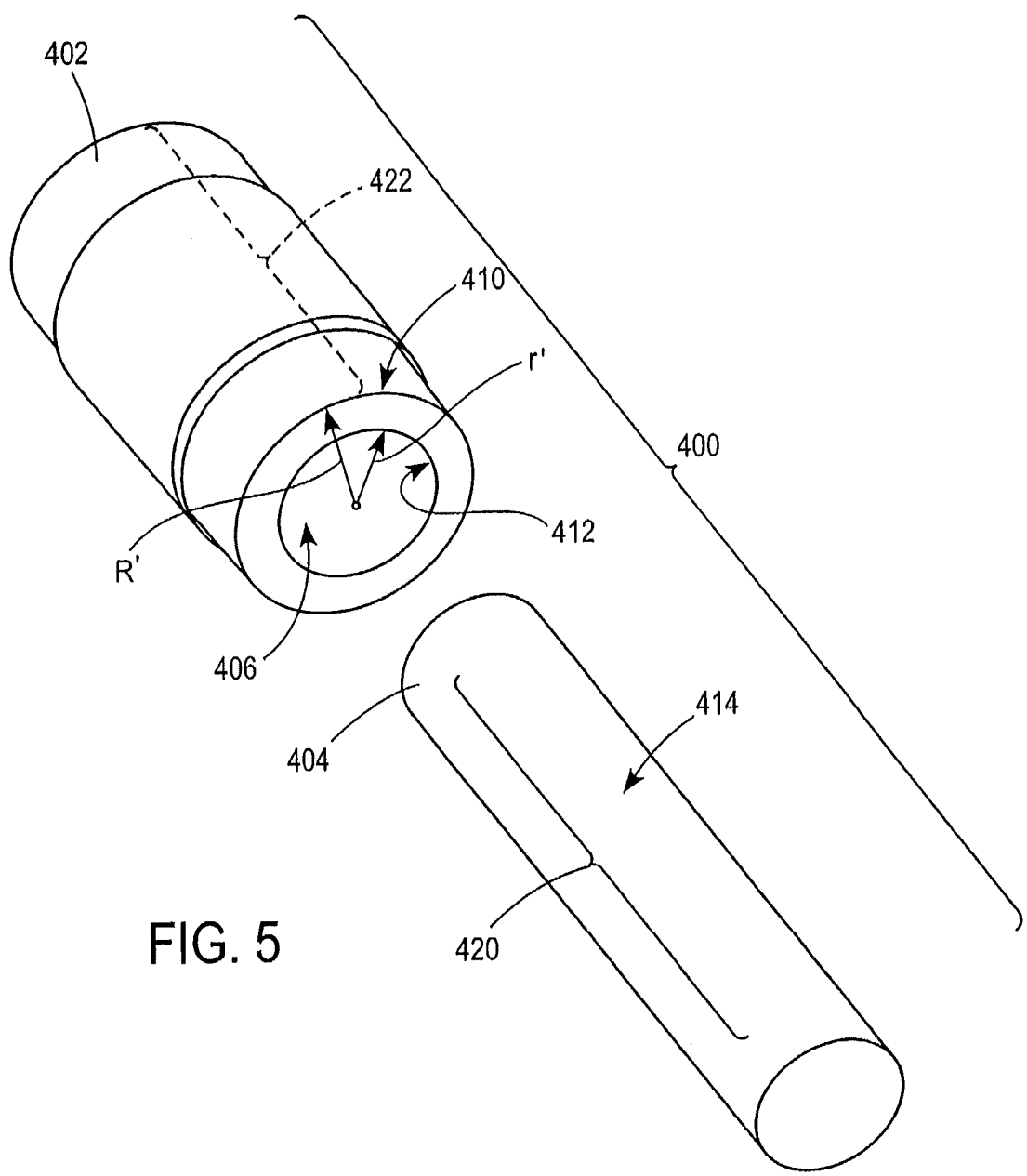
FIG. 5 shows a schematic perspective view of a disassembled pin bushing joint showing the areas having hard facing applied.

In a still further exemplary embodiment, the undercarriage assembly component having a metallurgically bonded wear resistant coating is the separate components of a track pin/bushing joint, e.g., a track pin and an inner diameter of a track pin pushing. A track pin/bushing joint is shown in schematic perspective view in FIG. 4. In FIG. 4, an assembled pin bushing joint 400 includes a track pin bushing 402 with a track pin 404 inserted in the bore 406 of the track pin bushing 402. FIG. 5 shows a schematic perspective view of a disassembled pin bushing joint 400 showing the areas of the track pin bushing 402 and the track pin 404 having hard facing applied. The exemplary pin bushing joint 400, e.g., the pin bushing joint of an endless track of a track-type machine, comprises a bushing 402 including an outer surface 410 having an outer radius R' and including an inner surface 412 having an inner radius r' and a track pin 404 including an outer surface 414. A portion 420 of the outer surface 414 of the track pin 404 substantially conforms to a portion 422 of the inner surface 412 of the bushing 410 to form a wear surface that has a metallurgically bonded, wear-resistant coating. The wear-resistant coating comprises a fused hard metal alloy comprising at least 60% by weight iron, cobalt, nickel or alloys thereof.

Figure 6:
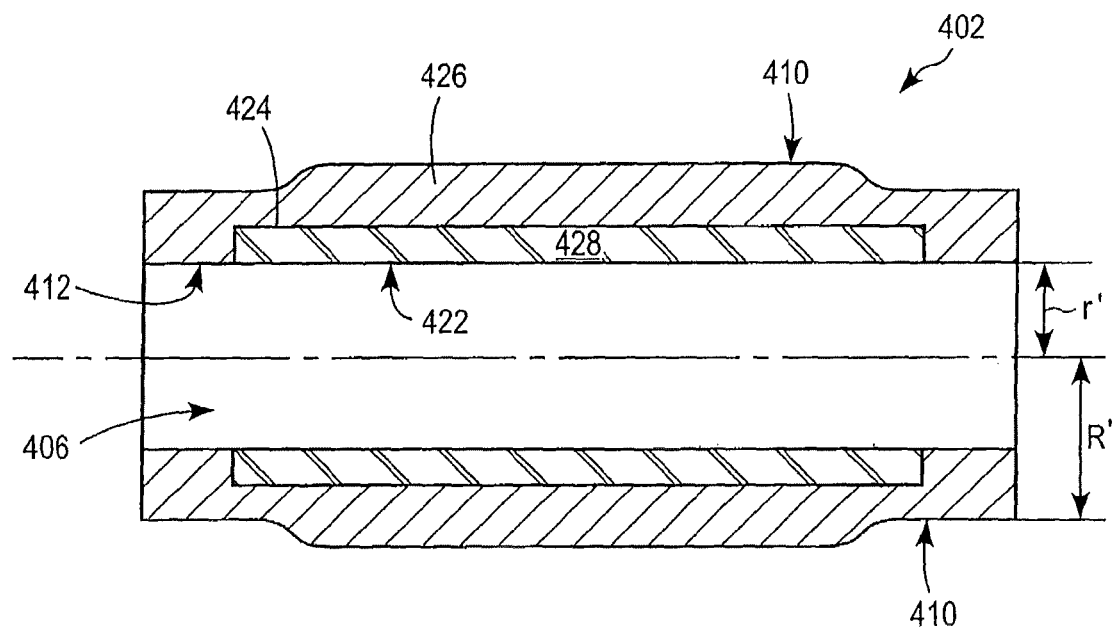
FIG. 6 shows a schematic cross-section of a hardfaced track pin bushing.

FIG. 6 shows a schematic cross-section of an exemplary hardfaced track pin bushing 402. In the FIG. 6 view, the outer surface 410 having outer radius R' and inner surface 412 having inner radius r' can be seen. Also, the portion 422 of the inner surface 412 of the bushing 410 contributing to forming the wear surface is shown. The portion 422 is shown as a channel 424 in the body 426 of the pin bushing 410 that has been filled with the metallurgically bonded, wear-resistant coating 428 and optionally machined to a desired surface position and roughness, e.g., machined level to the inner radius r. Optionally, the portion 422 can be any portion of the length of the bore 406, including the entire length, and the metallurgically bonded, wear-resistant coating 434 can also optionally be applied directly to the inner surface 412 of the as-formed pin bushing 410, without any premachining such as premachining to form the channel 424. Further and optionally, the outer surface of the bushing, such as outer surface 410 in FIG. 6, can also be hardfaced along the entire area or a portion of the area using a similar metallurgically bonded, wear-resistant coating.

Figure 7:
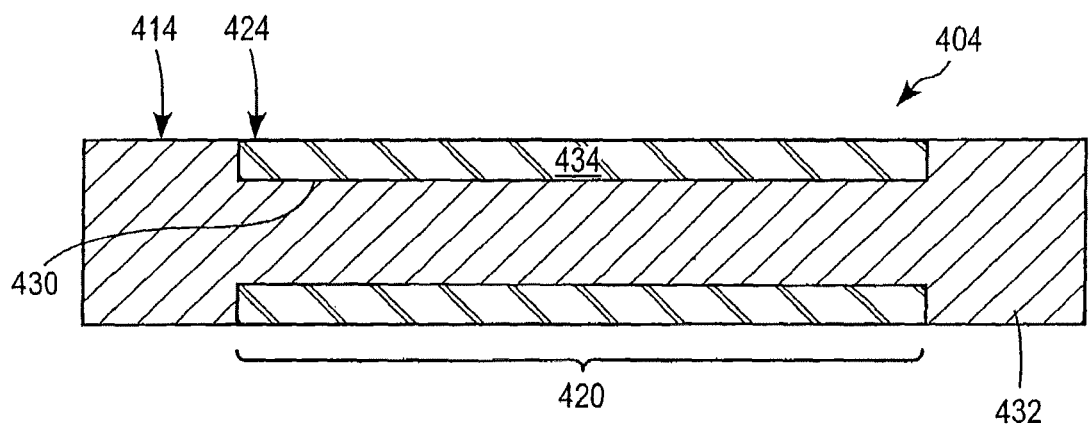
FIG. 7 shows a schematic cross-section of a hardfaced track pin.

FIG. 7 shows a schematic cross-section of an exemplary hardfaced track pin 404. In the FIG. 7 view, the outer surface 414 can be seen. Also, the portion 420 of the outer surface 414 of the track pin 404 contributing to forming the wear surface is shown. The portion 420 is shown as a channel 430 in the body 432 of the pin 404 that has been filled with the metallurgically bonded, wear-resistant coating 434 and optionally machined to a desired surface position and roughness, e.g., machined level to the outer surface 414. Optionally, the portion 420 can be any portion of the length of the pin 404, including the entire length, and the metallurgically bonded, wear-resistant coating 434 can also optionally be applied directly to the outer surface 414 of the as-formed pin 404, without any premachining such as premachining to form the channel 430.

In a proposed modified manufacturing process for a pin bushing joint, the forged pin bushing and forged track pin are undercut by a small amount (generally 1-2 mm depending on the thickness of wear coating required) in the vicinity of the portions of the pin bushing and track pin which come in contact in the pin bushing joint, e.g., the wear surfaces, and a slurry coating is applied to the machined surface to a thickness such that, when fused, the slurry surface would coincide with the desired surface, i.e., the surface obtained before undercutting. The fused slurry coating forms a strong metallurgical bonding and does not spall off the steel substrate even on heating and cooling, as in the hardening process or when subjected to severe impact loads during service.

Similar to the discussions and treatments disclosed herein related to pin bushing joints, other types of pin/busing joints such as hinge pin bushing where two machine members are hinged together can have a metallurgically bonded wear resistant coating. The discussions and treatments disclosed herein related to pin bushing joints are generally equally applicable to these other types of pin/busing joints and it should be understood that this disclosure extends to such other types of pin/busing joints.

Figure 1:
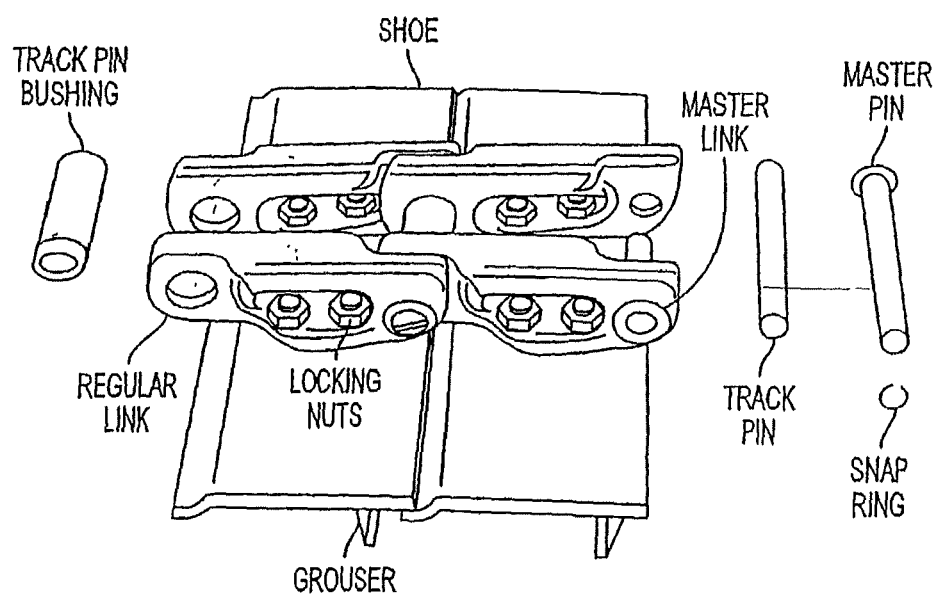
FIG. 1 shows the components of a typical endless track including a track bushing.
Figure 8:
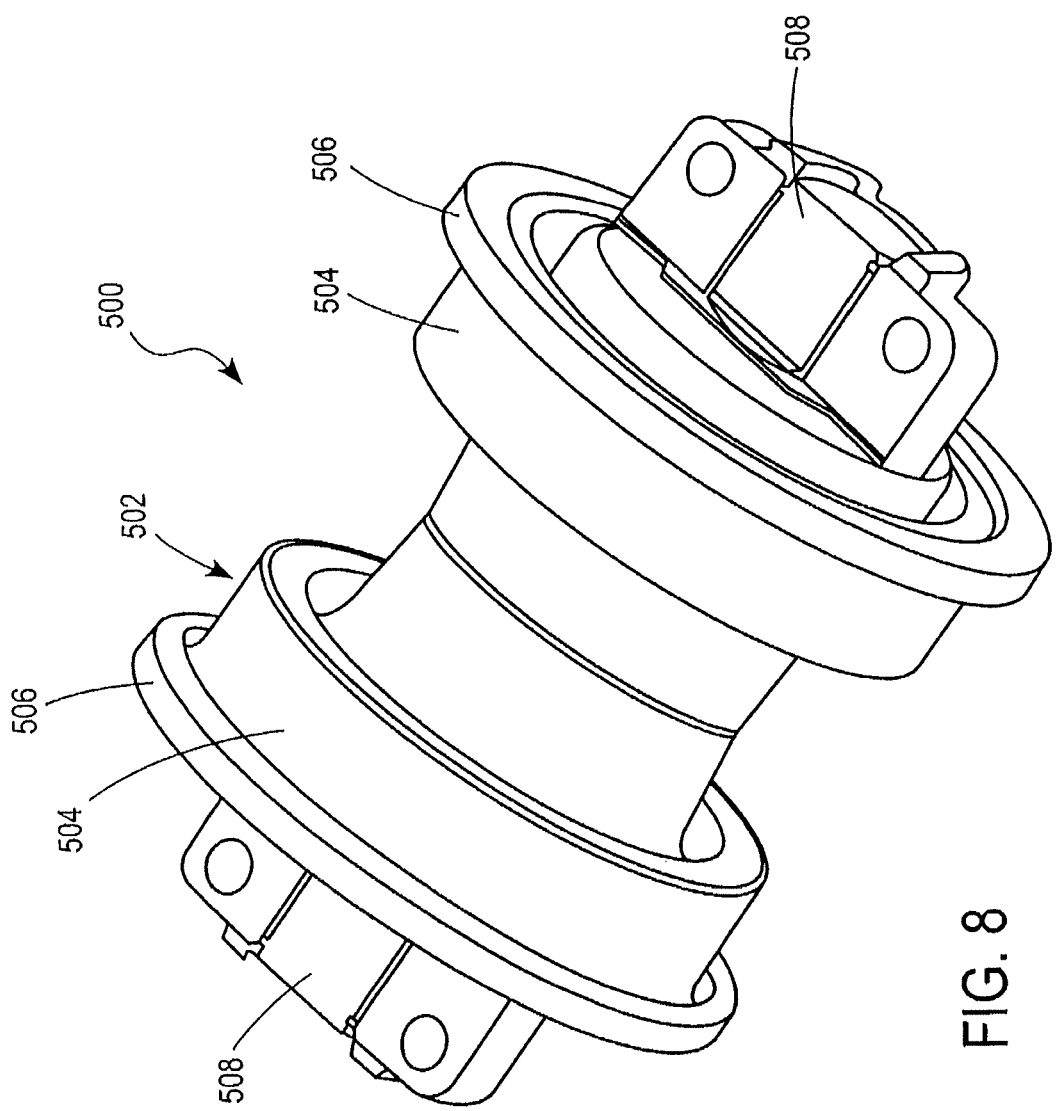
FIG. 8 shows schematic perspective view of an undercarriage track chain bottom roller showing the areas having hard facing applied.

In another exemplary embodiment, the undercarriage assembly component having a metallurgically bonded wear resistant coating is an undercarriage track chain bottom roller. FIG. 8 shows a schematic perspective view of an exemplary undercarriage track chain bottom roller 500 showing the areas having hard facing applied. In the FIG. 8 view, the outer surface 502 can be seen. The outer surface 502 has substantially cylindrical regions 504 bounded axially outwardly by flange portions 506. At least one flange portion 506 is of greater diameter than the substantially cylindrical regions 504. Mounting surfaces 508 for installation in the track of a track-type machine are also shown. The substantially cylindrical regions 504 are adapted to contact a contact surface of a track chain link, e.g., the upper rail surface of the chain link as seen, for example, in the portion of the track of a track-type machine shown in FIG. 1. In operation, some or all of the substantially cylindrical regions 504 and the flange portions 506 are subjected to wear and, therefore, some or all of the substantially cylindrical regions 504 and for the flange portions 506 have hard facing applied thereto.

Figure 9:
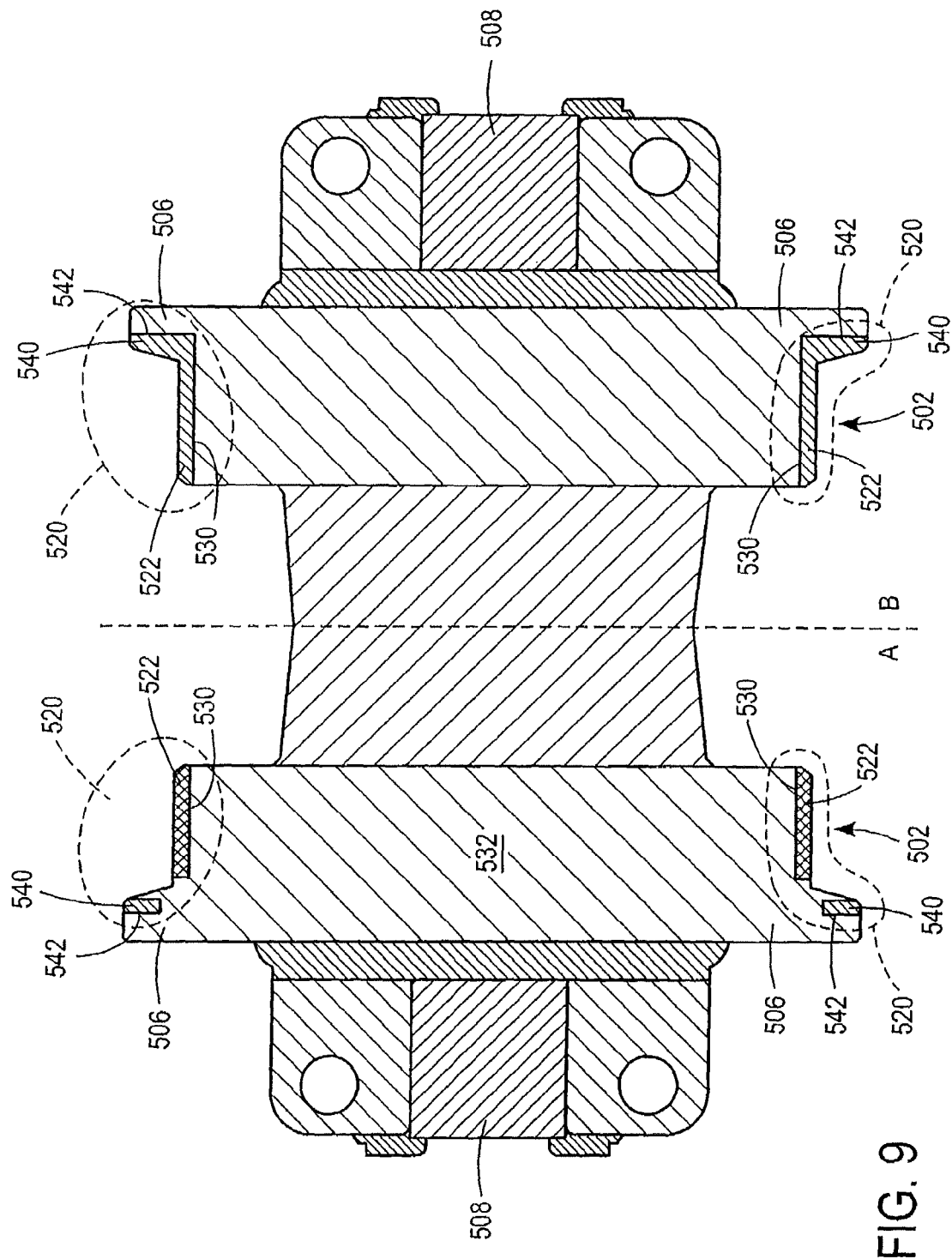
FIG. 9 shows a schematic cross-section of a hardfaced undercarriage track chain bottom roller.

FIG. 9 shows a schematic cross-section of a hardfaced undercarriage track chain bottom roller 500 showing the substantially cylindrical regions 504, the flange portions 506 and the mounting surfaces 508. Portions 520 of the substantially cylindrical regions 504 and the flange portions 506 have a metallurgically bonded, wear-resistant coating 522 comprising a fused hard metal alloy comprising at least 60% by weight iron, cobalt, nickel or alloys thereof. Two variations (A and B) for the portions 520 are shown in FIG. 9, although multiple variations including those not shown may be used. Further, although FIG. 9 shows a bottom roller 500 incorporating two different variations (A and B), it should be understood that both uniform and different variations may be used.

The portions 520 having the metallurgically bonded, wear-resistant coating 522 are shown as a channel 530 in the body 532 of the substantially cylindrical regions 504. In one exemplary embodiment, the channels 530 have been filled with the metallurgically bonded, wear-resistant coating 522 and optionally machined to a desired surface position and roughness, e.g., machined level to the outer surface 502, such as the outer surface of the substantially cylindrical regions 504. In addition, the metallurgically bonded, wear-resistant coating 522 can also optionally be applied directly to the outer surface 502 of the as-formed undercarriage track chain bottom roller 500, without any premachining such as premachining to form a deposit area, e.g, a channel 530.

Optionally, exemplary embodiments can include the metallurgically bonded, wear-resistant coating 522 at any portion of the substantially cylindrical regions 504, including the entire length of the outer surface of one or more of the substantially cylindrical regions 504. Further optionally, exemplary embodiments can include a metallurgically bonded, wear-resistant coating 540 at any portion of the flange portion 506, including the entire length of the outer surface of one or more of the flange portions 508. When the metallurgically bonded, wear-resistant coating 540 is included at any portion of the flange portion 508, the metallurgically bonded, wear-resistant coating 540 can be a separate coating from the metallurgically bonded, wear-resistant coating 522 associated with the substantially cylindrical regions 504 (as shown in variation A), or the metallurgically bonded, wear-resistant coating on the flange can be continuous, at least at the outer surface 502, with the metallurgically bonded, wear-resistant coating 522 associated with the substantially cylindrical regions 504. In addition, the metallurgically bonded, wear-resistant coating 540 can also optionally be applied directly to the outer surface 502 of the as-formed undercarriage track chain bottom roller

500, without any premachining such as premachining to form a deposit area, e.g, a channel 542.

In the proposed modified manufacturing process for a bottom roller, the bottom roller is undercut by a small amount (generally 1-2 mm depending on the thickness of wear coating required) in the vicinity of the portions of the bottom roller which come in contact with the track chain link, e.g., the wear surfaces such as portions of the substantially cylindrical regions and/or portions of the flange portion, and a slurry coating is applied to the machined surface to a thickness such that, when fused, the slurry surface would coincide with the desired surface, i.e., the surface obtained before undercutting. The fused slurry coating forms a strong metallurgical bonding and does not spall off the steel substrate even on heating and cooling, as in the hardening process or when subjected to severe impact loads during service.

Figure 10:
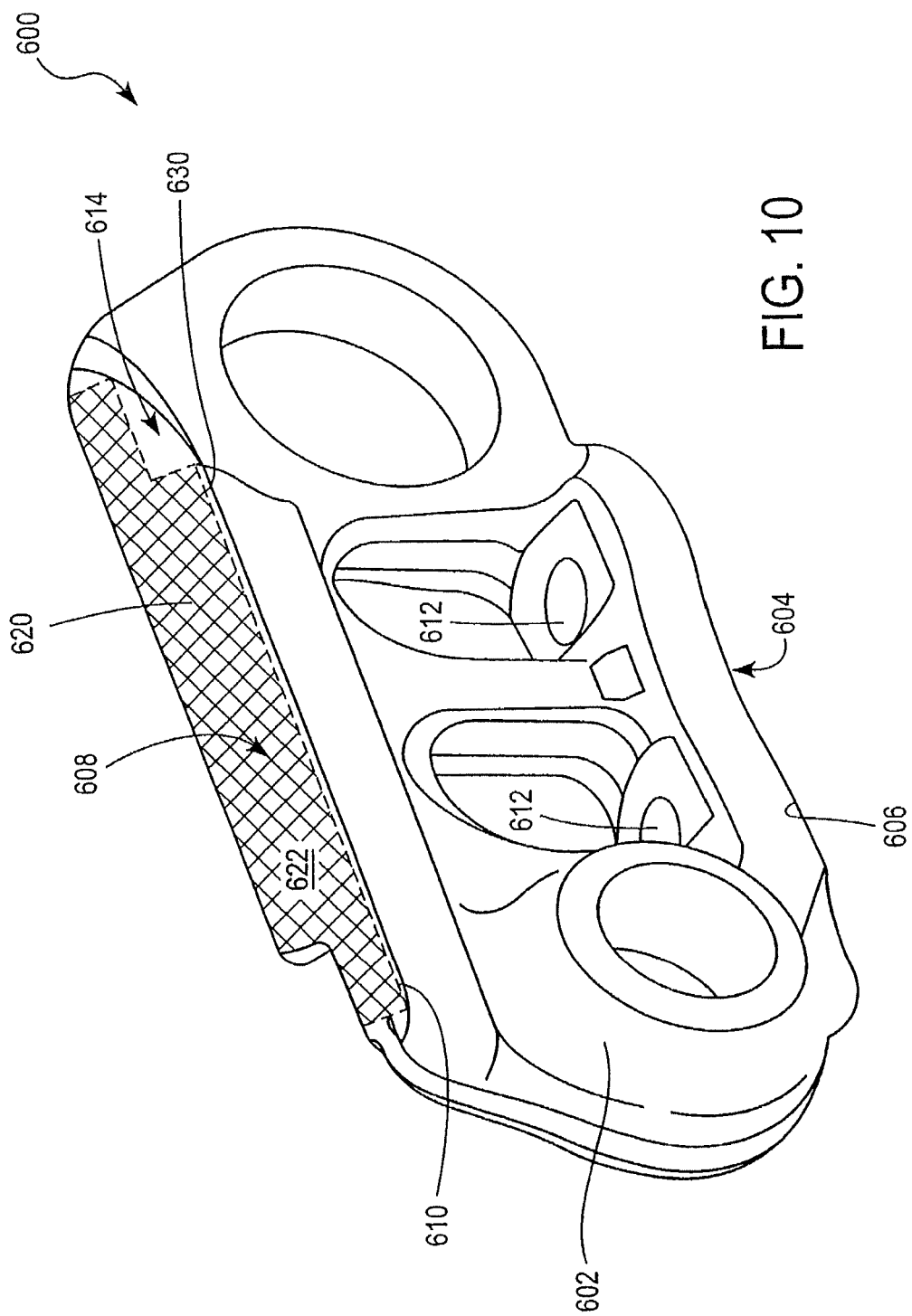
FIG. 10 shows a schematic perspective view of a first side of a track chain link showing the areas having hard facing applied.

In a still further exemplary embodiment, the undercarriage assembly component having a metallurgically bonded wear resistant coating is a track chain link. FIG. 10 shows a schematic perspective view of a first side of an exemplary track chain link showing areas having hard facing applied. In the exemplary embodiments, the track chain link 600 comprises a body 602 formed of hardened steel, a mounting surface 604 on a first edge 606 of the body 602 and a contact surface 608 on a second edge 610 of the body 602. The mounting surface 604 includes at least one opening 612 for an attachment device, e.g., an attachment device to permanently or removably affix the track chain link to a shoe of a track of a track-type machine as shown, for example, in FIG. 1. The contact surface 608 is opposite the mounting surface 604 and includes a substantially planar region 614 extending a distance along the second edge 610 forming a wear surface.

At least portions of the wear surface, e.g., portions 620 of the substantially planar region 614, have a metallurgically bonded, wear-resistant coating 622 comprising a fused hard metal alloy comprising at least 60% by weight iron, cobalt, nickel or alloys thereof. The portions 620 having the metallurgically bonded, wear-resistant coating 622 have a channel 630 in the body 602 of the track chain link 600. In one exemplary embodiment, the channels 630 have been filled with the metallurgically bonded, wear-resistant coating 622 and optionally machined to a desired surface position and roughness, e.g., machined level to the substantially planar region 614. In addition, the metallurgically bonded, wear-resistant coating 622 can also optionally be applied directly to the outer surface of the as-formed track chain link 600, prior to core hardening, and without carburizing. The application can be done without any premachining such as premachining to form a deposit area, e.g, a channel 630.

In the proposed modified manufacturing process for a track chain link, the forged link surface which comes in contact with the roller surface is undercut by a small amount (generally 1-2 mm depending on the thickness of wear coating required) and a slurry coating is applied to the machined surface to a thickness such that, when fused, the slurry surface would coincide with the desired surface, i.e., the surface obtained before undercutting. The fused slurry coating forms a strong metallurgical bonding and does not spall off the steel substrate even on heating and cooling, as in the hardening process or when subjected to severe impact loads during service.

A slurry coated link can optionally then be through hardened by quenching and tempered to the required bulk hardness for improving the mechanical strength of the link. The substrate below the coated surface is optionally again hardened by induction hardening to increase the substrate hardness to HRC 50-60, more particularly, 55-60 HRC which is higher than the bulk hardness of the quenched and tempered link steel. This adds further to the wear life of the link. Thus, the wear life of a coated and heat treated (by through-hardening and induction hardening) link can be the sum of the wear life of the slurry coating and the wear life of the induction hardened steel is substrate below the coating. A similar observation can be made for other coated and heat treated parts, such as the pin bushing and pin of the pin bushing joint and the undercarriage track chain bottom roller. This sum may be 4 to 6 times that of the uncoated metal part depending upon the slurry coating thickness used. Normally not more than 1-2 mm thick coating may be required to achieve wear/corrosion objectives. Though macroscopic surface cracks tend to form in the coating during the through hardening and induction hardening processes, the coating does not detach from the substrate. This is due to the strong metallurgical bonding of the coating to the substrate. The cracks help to relieve stresses formed during fusing of the coating. However, such cracks are less likely to be observed if the coated part is not heat treated (quenched).

In exemplary embodiments, the wear-resistant coating is a fused alloy that is substantially harder and more wear-resistant than the steel typically used for tools, gears, engine parts, farm implements, and so forth, e.g., 1045 grade steel even in the hardened conditioned. Further, the wear-resistant coating preferably contains substantially no inclusions, such that the wear-resistant coating is uniformly dense and less brittle and more durable than that obtained in the prior work, such as Alessi, U.S. Pat. No. Re. 27,851.

Commonly owned U.S. Pat. No. 5,879,743, the entire contents of which are incorporated herein by reference, discloses such a wear-resistant alloy. Additionally, slurry and coating techniques incorporating the slurry that are suitable for use in the methods and devices disclosed herein are disclosed. For example, the fusible hard metal alloy in exemplary embodiments is preferably at least 60% of a transition metal of Group VIII of the Periodic Table, such as iron, cobalt, or nickel. However, the hard metal alloy may be based on other metals so long as the alloys have the physical properties stated above and would form a metallurgical bond with, in this case, the ferrous substrate. Minor components (about 0.1 to about 20 wt. %) typically are boron, carbon, chromium, iron (in nickel and cobalt-based alloys), manganese, nickel (in iron and cobalt-based alloys), silicon, tungsten, molybdenum, one or more carbide forming elements, or combinations thereof. Elements in trace amounts (less than about 0.1 wt. %), such as sulfur, may be present as de minimis, contaminants. In exemplary embodiments, the alloy has a Vickers Hardness (HV) above 950 HV, and more particularly, from 950 to 1250 HV. The hard metal alloy has a fusion temperature which is lower than the melting point of the metal that is to be coated, e.g., about 1110° C. or less, and is preferably, between about 900° C. and about 1200° C., preferably up to about 1100° C.

Methods for hardfacing with a wear-resistant coating a metal surface of a part formed from a non-carburized metal are provided.

A slurry of a hard metal alloy is coated on an area of an uncarburized part and a metallurgical bond is formed between the non-carburized material and the coated unfused slurry by fusing the hard metal alloy, thereby forming the wear-resistant coating.

Alternatively, an exemplary method prepares the surface of the metal part, i.e., the surface of the track pin bushing, by decarburizing the surface for a suitable period of time to reduce and, at long time periods, remove carbon from the surface of the metal part to a desired depth. In one aspect, decarburization occurs in the surface layer to a depth such that the subsequent metallurgical bond only occurs with noncarburized metal. For example, decarburization of the carburized layer occurs to a depth of 0.002-0.003 inch (50-75 microns) to a carbon level of 0.4-0.6 wt %. In another aspect, decarburization occurs to a depth of at least the thickness of the carburization layer+0.5 mm, i.e., to 3.0 mm for a typical track pin bushing that is carburized to a depth of 2.5 mm. In another aspect, the carburized depth is up to 0.010 inches and the decarburization occurs up to 0.015 inches.

In examples where the slurry has been applied to a carburized substrate, e.g., a carburized ferrous substrate with an increased concentration of carbon in a surface layer relative to an interior layer, a metallurgical reaction between carbon and the slurry has been observed. In the metallurgical reaction, carbon from the substrate diffuses into the coating, increasing the carbon content at the interface. The increased carbon at the interface depresses the melting point of the slurry alloy in the interfacial region, e.g., the interfacial layer between the slurry alloy and the substrate, resulting in the slurry alloy sloughing off the substrate. To mitigate this effect, the above procedure wherein noncarburized material is exposed has been used. In another approach, the surface of the substrate to which the slurry is applied is kept substantially horizontal, e.g., within 5 to 10° of horizontal, during fusing so as to minimize sloughing during the fusing time, e.g., during the several minutes at the fusing temperature (not including the temperature ramp-up and cool down time).

The slurry is aqueous-based and can be formed of polyvinyl alcohol (PVA) and a fusible, hard metal alloy in the form of a finely divided powder. Examples of a suitable slurry are disclosed in commonly owned U.S. Pat. No. 5,879,743, the entire contents of which are incorporated herein by reference. As discussed herein and disclosed in the '743 patent, the hard metal alloy can be a transition metal of Group VIII of the Periodic Table, such as iron, cobalt, nickel, or alloys thereof. In an exemplary embodiment, the hard metal alloy is in the form of a finely divided powder having a sufficiently small particle size to form a uniform slurry. Typical particle sizes range from about 90 mesh to about 400 mesh and may be finer than 400 mesh. Preferably, the average particle size is finer than about 115 mesh and, most preferably, finer than about 200 mesh. The powder can be a mixture of powders of different particle sizes. Also, one or more suspension agents and one or more deflocculants can optionally be added to the slurry.

Further, the slurry used is prepared by thoroughly mixing the powdered, hard metal alloy with the polyvinyl alcohol binder solution to give the desired alloy to binder solution weight ratio, as described in commonly owned U.S. Pat. No. 5,879,743, the entire contents of which are incorporated herein by reference. Other additives to the slurry can include suspension agents and deflocculants.

The slurry can be applied in any suitable manner. For example, the slurry can be spray coated, spun cast, dipped, poured, or spread, i.e., applied with a brush or a doctor blade.

In one exemplary embodiment of a method for hardfacing a metal surface with a wear-resistant coating, a substantially uniform aqueous slurry of polyvinyl alcohol and a fusible, hard metal alloy in the form of a finely divided powder is formed and coated on the metal surface. The aqueous slurry is then dried, preferably by applying external heat, to leave a solid layer of the fusible, hard metal alloy in a polyvinyl alcohol matrix on the metal surface. The steps of coating the metal surface and drying the slurry to leave a solid layer may be repeated one or more times to build up a thicker coating of the slurry material.

In another exemplary embodiment of a method for hardfacing a metal surface with a wear-resistant coating, the metal surface is coated with an aqueous polyvinyl alcohol solution and a substantially uniform layer of a fusible, hard metal alloy in the form of a finely divided powder is distributed onto the coating of the polyvinyl alcohol solution before the polyvinyl alcohol solution dries. The steps of coating the metal surface, distributing the fusible hard metal alloy, and drying the mixture of polyvinyl alcohol, binder and alloy powder to leave a solid layer may be repeated one or more times to build up a thicker coating of the slurry material.

In an exemplary embodiment of the method of the present invention, the preferred procedure for applying a slurry to the metal surface to be coated depends on the shape and size of the metal item having the metal surface as well as the ratio of hard metal alloy and the concentration of the polyvinyl alcohol binder solution. Typically, the unfused slurry is poured, brushed, or sprayed on the metal surface to be protected, or the item having the metal surface to be protected can be dipped into the unfused slurry.

Dipping, pouring, and brushing is useful for forming relatively thick coatings, e.g., greater than 1 mm, in a short period of time, although repeated spaying can also be used to build up a thick layer over a longer period of time. For these procedures, preferably the ratio of hard metal alloy to PVA solution is in the range of about 4:1 to about 8:1 and the concentration of PVA solution is about 1% to about 15% PVA by weight. For example, 0500/0250 and 0600/0250 or similar slurries are suitable for this procedure. The representation xxxx/yyyy indicates the slurry parameters, where xxxx=weight ratio of powdered alloy to polyvinyl alcohol and yyyy=weight percent of polyvinyl alcohol present in the aqueous solution as a binder. Note that a decimal point is implicit after the first two digits in the representation. Thus, 0500 represents 5.0. Thick slurry compositions, i.e., a high ratio of alloy to PVA solution, can be applied as a squeezable paste, or can be rolled into tapes for bonding to the metal surface. For these procedures, preferably the ratio of alloy to PVA solution is in the range of about 8:1 to about 15:1 by weight and the concentration of PVA solution is about 2% to about 15% PVA by weight. In the above procedures, special additives can function as dispersants, suspending agents, and plasticizers.

In addition to the above methods of applying the coating, paste and tape methods can be used for thick coatings. However, these procedures are difficult to adapt to a high speed production environment. Accordingly, when a thick coating is desired, a reliable and economical alternative to paste and tape is a multiple coating procedure which produces uniformly thick slurry coatings even on large surfaces. The required thickness can be built by repeated spraying with intervening drying cycles. The drying may be done at about 80° C. to about 100° C. in, for example, a forced circulation air oven. A 0500/0250 slurry is particularly suitable for this method, though other formulations may be used.

The thickness of the coated unfused slurry can be adjusted by a shrinkage factor to result in a desired final thickness after metallurgical bonding, i.e., the final thickness can be flush to the surface or diameter, protruding from, or recessed into the surface diameter of the metal piece. For example, the slurry described herein was found to have a shrinkage factor of about 0.55±0.05. Accordingly, the thickness of the slurry before fusing can be adjusted according to the shrinkage factor to result in a desired final thickness of the wear-resistant coating, e.g. an unfused slurry layer of 1.67 to 2.0 times the final thickness is used.

Bonding is the step of forming a metallurgical bond between the dried slurry coating and the metal part, i.e., a selected portion of the non-carburized or decarburized metal part, or a selected portion of the metal part that has been decarburized. For example, the metal surface coated with the layer of fusible, hard metal alloy in the polyvinyl alcohol matrix or coated with the aqueous polyvinyl alcohol solution with the layer of fusible, hard metal alloy can be heated to the fusing temperature of the hard metal alloy under a protective atmosphere until the hard metal alloy has fused onto the metal surface. Heating occurs in a controlled atmosphere, i.e., an inert or reducing atmosphere, excluding nitrogen which nitrides the alloy and can hinder alloy fusion. For example, a partial pressure of 100 to 500 μm of He or Ar in a vacuum furnace or a slight positive pressure of about a few inches of water above atmospheric pressure of Ar, He or $H_2$ in a belt furnace are suitable for use during fusing. Subsequently, the metal surface with the fused hardfacing is cooled to ambient temperature.

In one example of the bonding process, the track pin bushing is heated to a temperature of about 1065° C. to 1110° C. The heating is done in a belt type conveyor furnace at a hydrogen pressure slightly above atmospheric, and the track pin bushing is held at the desired fusing temperature for approximately 2 to 5 minutes and then cooled In further exemplary embodiments, after metallurgically bonding the slurry to the metal part to form the wear-resistant coating, the remaining metal of the metal part can be hardened to a desired hardness by quenching. For example, the remaining carburized metal can be hardened by a thermal treatment that increases hardness as compared to the uncarburized metal. In an exemplary embodiment where the metal part is a track pin bushing, the remaining metal corresponds to at least one of the inner surface of the track pin bushing, the first end of the track pin bushing, and/or the second end of the track pin bushing.

Experiments were conducted to study the effect of carburization on slurry bond formation. Small low carbon steel track pin bushings with a 10 mm wall thickness were carburized and air cooled. The carburization layer was approximately 2 to 2.5 mm in thickness. These samples were then reheated to 1600° F., in a decarburizing, i.e., low carbon potential, atmosphere for 1, 2, and 3 hours resulting in decarburized layers of thickness 0.0005-0.0007, 0.001-0.0012, and 0.001-0.0015 inches, respectively. The decarburized samples were slurry coated with a fusible, hard metal slurry and bonded following the procedures outlined above. Additional details of slurry coating and bonding can be found in U.S. Pat. No. 5,879,743, the contents of which are herein incorporated by reference.

Subsequent to coating and bonding, the steel/slurry interface was examined in an optical microscope. The integrity of the bond improved as the decarburization time increased, suggesting that the steel alloy with increased depth of decarburization and/or the steel alloy with the lower carbon content more readily bonded with the slurry. However, the bushings showed evidence of flow of slurry coating during fusing due to gravity, though the tendency to flow decreased with the increase in the decarburization layer thickness.

These results indicate that decarburization can be used prior to slurry coating to improve bonding results. However, the decarburization process has at least two disadvantages: Decarburization on a partial surface (for example, only on an outer diameter and not on an inner diameter and/or the end faces) is not practical, and the time required for sufficient decarburization to occur, i.e., for an adequate noncarburized layer to form on which to coat the unfused slurry is upwards of several hours, perhaps as long as 7-10 hrs, which can be economically unviable.

However, the coating process can desirably be carried out on a material prior to any carburization, as described more fully herein. In another exemplary method involving removal of carburized material, carburized material is removed by, for example, machining, cutting, lathing, grinding, and or polishing, to expose a non-carburized layer. In experiments corresponding to this method, four track pin bushings had their outer diameters reduced by machining. The amounts removed were 3.00, 3.35, 3.75, 4.00 mm, respectively. The samples were then coated in the exposed area with a hard metal slurry and bonded following the procedures outlined above.

Visual examination of the bonding region indicated a good coating bond with no gravity flow during fusing. Optical microscopy of sectioned bushings showed a steel/slurry coating interfacial bonding region with few or no inclusions and with good metallurgically bonding for all samples. Removal of a carburized layer sufficient to expose an uncarburized layer, in this case approximately 3 mm of material, was therefore concluded to result in good bond formation. This conclusion was further substantiated by a third experiment in which a carburized track pin bushing was subject to a normalizing heat treatment and a 3 mm depth was machined from the outer diameter of the cross-section of the machined bushing. Optical microscopic examination showed that the carburized layer was completely removed by this machining and the exposed surface had a microstructure corresponding to the precarburization microstructure.

In a still further experiment involving removal of carburized material, track pin bushings with 2 mm carburized case were machined on a portion of the axial length of the outer surface to a depth of 2.5 mm to remove the carburized case and the area was slurry coated. Coating was accomplished by the use of a hand-held sprayer and a hand-operated fixture to obtain a substantially uniform coating thickness. The hand operated fixture resembled a spindle on which the pieces were axially mounted and a hand crank for manual operation, although machine powered rotation could be used as well as automated techniques such as computer controlled equipment, i.e., rotation equipment, spraying equipment, robotics, and so forth. The unfused slurry surface was then machined on a lathe to make it smooth and concentric with the bore of the track pin bushing. Slurry thickness before fusing was adjusted to yield 1 mm or 1.5 mm fused thickness, based on the shrinkage factor, i.e., the empirically derived relationship that the fused thickness is about 0.55 times the unfused thickness. This machining operation, as was found after fusing, also helped produce a coating with a smooth surface and uniform thickness.

The track pin bushings with machined and cooled surfaces were fused using a suitable time-at-temperature (T-t) cycle. In exemplary embodiments, the T-t cycle is conducted in a vacuum furnace or a belt furnace under a controlled atmosphere, i.e., an inert or reducing atmosphere, excluding nitrogen which nitrides the alloy. A partial pressure of He or Ar in a vacuum furnace or a slight positive pressure, i.e., about a few inches of water above atmospheric pressure, of Ar, He or $H_2$ in a belt furnace are good examples. The track pin bushings were placed with the axes vertical in the furnace chamber, and the maximum temperature and the time at maximum temperature were carefully selected and monitored to prevent downward gravity flow of fused semi-liquid slurry metal.

An example of a suitable T-t cycle is as follows: gradually heat the track pin bushing at 10 to 15° C. per minute to 1080 to 1110° C., hold the temperature for 1 to 5 minutes, preferably 1 to 2 minutes, and cool the track pin bushing at any desired cooling rate, i.e., using a recirculating fan. A still further example of a suitable T-t cycle heats the track pin bushing at 8 to 10° C. per minute to 1065 to 1110° C.

Visual observation of representative samples of wear-resistant coated track pin bushings prepared by the exemplary method involving removal of carburized material revealed that the coating surface was smooth, representing the surface finish of the machined slurry surface before fusing. Further, the coating on the track pin bushings fused and bonded to the substrate without any noticeable gravity flow. Measurements using a micrometer showed that the track pin bushings did not undergo any noticeable distortion. In a follow-on investigation, a wear-resistant coated track pin bushing was ground using a silicon carbide grinding wheel and the ground surface examined under an optical microscope. The wear-resistant coating was found to be free or nearly free from porosity. Similarly, a cross section of a coating examined under the optical microscope showed little or no porosity in the interior of the coating.

The wear resistance was also evaluated for the wear-resistant coatings used for track pin bushings. Rubber wheel-sand abrasion tests revealed that the fused slurry coating wears at about ¼th to ⅙th the rate of quenched 1080 steel. Thus, a ⅓ to ½ mm fused slurry displayed, as a first approximation, the wear equivalent to a 2 to 3 mm thick layer of hardened 1080 steel.

As a result of the above series of experiments, the following generalized procedures for manufacture of slurry coated track pin bushings with a final outer diameter of D mm was determined where there is selected removal of carburized material:
1. Machine the track pin bushing per part drawing for the particular application and/or environment of use except that the outer diameter is increased beyond the desired final outer diameter to allow removal of material. In an exemplary embodiment of the track pin bushing described herein, the outer diameter is D+3.0 mm.
2. Carburize at least a portion of the track pin bushing.
3. Remove material from at least a portion of the carburized surface. In this example the carburized surface is the outer surface. Thus, at least a portion of the outer diameter surface is removed to at least expose a non-carburized layer. In addition, the outer diameter can be optionally further reduced to accommodate the desired thickness of the wear resistant coating. In the track pin bushing of the preferred exemplary embodiment, the at least portion of the outer diameter after removal of the material is D-3.0 mm. Thus, this step removes approximately 6 mm of material from an area on the carburized outer diameter surface.
4. Coat the exposed surface of the track pin bushing with the hard metal slurry to a thickness (before fusing) to obtain a desired outer diameter before fusing. For example, coat the exposed surface of the track pin bushing to a thickness of 2.75 mm, i.e., thickness equal to a diameter of (D−3 mm)+2.75×2. This corresponds to an outer diameter of D+2.5 mm.
5. Fuse the slurry to form a metallurgical bond between the exposed non-carburized layer and the slurry. In the case of the preferred embodiment of the track pin bushing described herein, the fused slurry thickness was 2.75×0.55 or 1.5 mm and the final bushing diameter was D, the desired diameter. Here the factor 0.55 is an experimentally established shrinkage factor for the slurry coating thickness.

Figure 11:
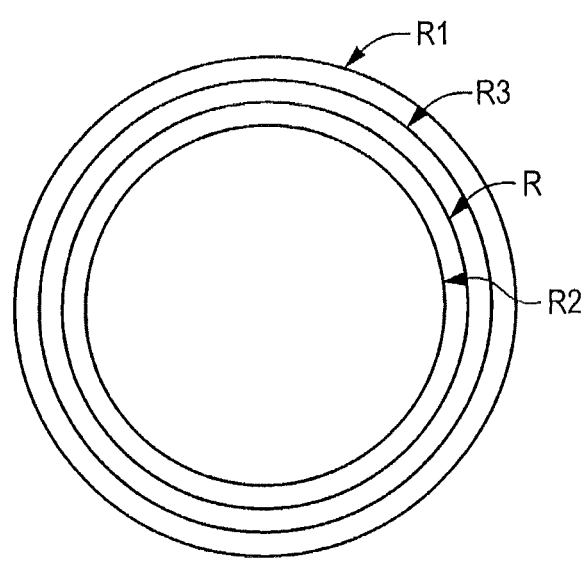
FIG. 11 shows a radial cross-section schematic representation of the radius variation during the method of hardfacing a track pin bushing with a wear-resistant coating.

In a further generalized procedure, the following relationships, referring to FIG. 11, were determined for a track pin bushing:

$$R_1 = R - X + Y + 0.5 \qquad \text{Eq. 1}$$

$$R_2 = R - X \qquad \text{Eq. 2}$$

$$R_3 = R + 0.82X \qquad \text{Eq. 3}$$

wherein R is the final finished radius of the track pin bushing, i.e., $R = R_2 + X$, $R_1$ is the outer radius of the track pin bushing as carburized, $R_2$ is the outer radius of the track pin bushing after removal of the carburized layer to expose a non-carburized layer and assuming the machined depth is 0.5 mm greater than the carburized depth, i.e., $R_2 = R_1 - (Y + 0.5)$, $R_3$ is the outer radius of the track pin bushing after slurry coating and before fusing, X is the thickness of the slurry coating after fusing assuming a shrinkage factor of 0.55 for the slurry coating during the fusing process, i.e., $X = 0.55(R_3 - R_2)$, and Y is the thickness of the carburized layer. All measurements are in millimeters (mm).

From the above, Equations 1-3 give the outer radius of the carburized track pin bushing, the outer radius after machining and the outer radius after slurry coating but before fusing, respectively, in terms of final track pin bushing outer surface radius R, if values of thickness of fused slurry layer, X, and carburized depth, Y, are known.

However, the coating process can desirably be carried out on a steel material prior to or without any carburization. By coating the uncarburized part and then hardening by e.g., induction hardening, the need to decarburize or to machine parts to remove carburized material, are eliminated. As a result, the coating can be applied to, e.g., a medium carbon alloy steel. Following induction hardening, a coating layer having a Vickers hardness of greater than 950 HV is obtained. Below this coating is a layer of near-resistant steel with a hardness value of 55-60 HRC.

In another exemplary embodiment, the undercarriage assembly component having a metallurgically bonded wear resistant coating is a track pin/bushing joint and the separate components of a track pin/bushing joint, e.g., a track pin and an inner diameter of a track pin pushing. FIG. 4 shows a schematic perspective view of an assembled pin bushing joint including a track pin bushing with a track pin inserted in the bore. FIG. 5 shows a schematic perspective view of a disassembled pin bushing joint. A track pin/bushing joint has mating surfaces including an outer surface of the pin and the inner diameter surface (or bore surface) of the bushing.

In the present invention, the bore surface of the bushing and outer surface of the pin are provided with a coating harder than sand using the following steps:
1. The mating surfaces are cleaned and grit blasted and a slurry containing highly alloyed iron based powder or any functionally similar powder is applied as described in greater detail in the prior patent (Revankar; U.S. Pat. No. 5,879,743 Mar. 9, 1999).
2. The slurry coating is then machined to the required pre-fuse dimensions to take into account the shrinkage of the coating during fusing, and then fused in a suitable furnace using appropriate fusing atmosphere. Either a vacuum furnace with a partial pressure of argon or a belt type furnace with hydrogen at a slight positive pressure are recommended.

3. The fused pin and the bushing may be heat treated if necessary to develop required mechanical properties of the substrate steel. The pin and bushing with the fused coating (with or without heat treatment) are then machined to the required final dimensions. The substrata steel may be machined using conventional machining tools and machining methods. But the coating surface requires at least a silicon carbide grinding wheel, preferably a diamond grinding wheel with appropriate bond type and grit size, to produce smooth bearing and sliding surfaces.

Since the coating is metallurgically bonded to the steel substrate there is no risk of debonding of coating even under the effect of high contact loads which are quite common in the heavy equipment. This benefit cannot be claimed by many of the currently available surface modification technologies.

The coating can be applied to any thickness desired unlike many other coatings or platings. This gives the freedom to apply thicker coatings to correspondingly increase the joint life. The latest hard coatings such as thin films applied using physical vapor deposition (3-5 microns) or chemical vapor deposition (10-25 microns), or electroplating of chrome (5-50 microns) or electroless nickel plating (2-20 microns), or practical thicknesses, have thickness limitations and are therefore not suitable for, e.g., long life P/B joints deployed in the heavy equipment industry.

Slurry coating can be easily applied to bores of long bushings without the line-of-sight limitations associated with PVD and thermal spray processes.

The coating technology permits the parts to be heat treated after the coating is fused without detriment to coating or its bond to the substrate. Most other surface coatings will be destroyed during such heat treatment.

This coating process has no environmental restrictions unlike hard chrome plating.

The alloy composition is chosen such that the fused coating has a hardness much higher than that of sand particles. Thus in the present case an alloy powder is used which gives a coating with a hardness of 800 to 1100 HV which is much higher than the hardness of sand particles (with an average hardness value of about 700 to 800 HV). Thus the sand particles which seep into the P/B joint do not cause the same extent of abrasion damage that the same sand particles would do to a carburized and quenched surface of currently used P/B joints. It is more likely the very fine sand particles will tend to polish the coating surface rather than abrade it severely. Since the sand particles would not damage the coating at the same rate at which they would a carburized and quenched surface, it would not be necessary to purge the grease as frequently. Since the coated surface will wear only much more slowly, the life of the joint would be extended considerably.

Experimental Work:

Cold rolled steel tubing, OD-95.25 mm (3.75 inch) and ID-76.20 mm (3.00 inch), was cut to make 4-50 mm, and 2-100 mm long bushings. The bore of the bushings was lightly machined to remove the mill scale, and coated with slurry, e.g., the slurry disclosed herein. The 'green' coating was then machined to produce a smooth surface concentric with the bushing axis. The thickness of the machined coating was varied to produce different thicknesses of fused coating, based on the previously established relationship between the unfused and fused coating thicknesses.

The bushings with machined 'green' coating were placed with their axes vertical, in a belt type hydrogen furnace and the coating was fused without any difficulty; the fused coating did not flow down the steel surface (substrate) due to gravity and also it did not shrink away from the steel. The as-fused surface of the coating was smooth. The fused coating thicknesses varied from 1.30 to 1.875 mm depending on the "green" thicknesses selected.

Efforts to grind the fused coatings on the bore of the bushings using aluminum oxide and silicon carbide wheels were not successful. The material removal rate was too low and the wheels appeared to labor without much cutting action, and produced a chattering sound indicating the grit was not hard enough to cut efficiently into Gopalite. Next, CBN wheel was used and found adequate to grind the coating. But it tended to "load up" and the grinding efficiency decreased quickly with time. Diamond wheel gave the best performance; it did not produce chatter and machined the coating at a much faster rate than CBN, about twice as fast. Diamond wheels are 15% more expensive than CBN but are definitely preferable for production machining. Grinding outer diameter surfaces could be achieved with silicon carbide grinding wheels since large diameter pieces could be used to take advantage of the larger kinetic energy of the abrasive particles, however, CBN and diamond are still preferred.

In one exemplary embodiment of a method for hardfacing a metal surface with a wear-resistant coating, a substantially uniform aqueous slurry of polyvinyl alcohol and a fusible, hard metal alloy in the form of a finely divided powder is formed and coated on the metal surface. The aqueous slurry is then dried, preferably by applying external heat, to leave a solid layer of the fusible, hard metal alloy in a polyvinyl alcohol matrix on the metal surface. The steps of coating the metal surface and drying the slurry to leave a solid layer may be repeated one or more times to build up a thicker coating of the slurry material.

In another exemplary embodiment of a method for hardfacing a metal surface with a wear-resistant coating, the metal surface is coated with an aqueous polyvinyl alcohol solution and a substantially uniform layer of a fusible, hard metal alloy in the form of a finely divided powder is distributed onto the coating of the polyvinyl alcohol solution before the polyvinyl alcohol solution dries. The steps of coating the metal surface, distributing the fusible hard metal alloy, and drying the slurry or the solution coating to leave a solid layer may be repeated one or more times to build up a thicker coating of the slurry material.

In an exemplary embodiment of the method of the present invention, the preferred procedure for applying a slurry to the metal surface to be coated to depends on the shape and size of the metal item having the metal surface as well as the ratio of hard metal alloy and the concentration of the polyvinyl alcohol binder solution. Typically, the unfused slurry is poured, brushed, or sprayed on the metal surface to be protected, or the item having the metal surface to be protected can be dipped into the unfused slurry.

For example, when the metal part such as a bottom roller, pin bushing and pin of a pin bushing joint, and track chain link, is formed of a medium carbon steel, the coated metal part can be quenched to harden the steel, for example, by heating to about 840° C. for a 1045 steel and soaking at the quenching temperature, in this case 840° C., for a time period which depends on the mass and wall thickness of the part, and quenching in a suitable quenching medium, preferably a liquid. The quenched steel part can be tempered at the desired temperature between 250° C. and 500° C. to achieve the required bulk hardness for improving the mechanical strength of the metal part and improving the wear resistance of the body of the metal part. The substrate below the coated surface may optionally again be hardened by induction hardening, if necessary, to increase the substrate hardness to approximately HRC 55-60 or more, which is higher than the bulk hardness of the quenched and tempered roller. This higher hardness of the coating substrate adds further to the wear life of the metal part and/or wear surfaces of the metal part such as a roller contact surface or a track chain link contact surface. Thus the wear life of a coated and heat treated (by through-hardening followed by induction hardening) metal part is the sum of the wear life of the slurry coating and the wear life of the induction hardened steel substrate below the coating. This sum may be 4 to 6 or more times that of the uncoated and quenched metal part depending upon the wear/corrosion objectives. Though macroscopic surface cracks tend to form in the coating during the through hardening and induction hardening process, the coating does not detach itself from the substrate. This is due, at least in part, to the strong metallurgical bonding of the coating to the substrate. The cracks help is to relieve stresses formed during fusing of the coating. However, such cracks are not generally observed if the coated part is not heat treated (quenched).

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:
1. A pin bushing joint of an endless track of a track-type machine, the pin bushing joint comprising:

a bushing including an outer surface having an outer diameter and including an inner surface having an inner diameter; and
a track pin including an outer surface,
wherein a portion of the outer surface of the track pin substantially conforms to a portion of the inner surface of the bushing to form a wear surface,
wherein one or both of the bushing and the track pin comprise non-carburized, hardened steel
wherein the wear surface has a metallurgically bonded, wear-resistant coating, the wear-resistant coating comprising a fused metal alloy comprising at least 60% by weight iron, cobalt, nickel or alloys thereof, and
wherein the wear-resistant coating has a Vickers hardness greater than 950 HV.

2. The pin bushing joint of claim 1, wherein the bushing and the track pin are formed of a hardened medium carbon steel.

3. The pin bushing joint of claim 2, wherein the hardened steel is induction hardened.

4. The pin bushing joint of claim 1, wherein an outer surface of the wear-resistant coating is flush with the outer surface of the track pin, and wherein the hardness of steel beneath the coating is 55-60 HRC.

5. The pin bushing joint of claim 1, wherein an outer surface of the wear-resistant coating is flush with the inner surface of the bushing, and wherein the hardness of steel beneath the coating is 55-60 HRC.

6. The pin bushing joint of claim 1, wherein the wear-resistant coating has a thickness of 1.5 mm.

7. The pin bushing joint of claim 1, wherein at least a portion of the outer surface of the bushing has a metallurgically bonded, wear-resistant coating, the wear-resistant coating comprising a fused metal alloy comprising at least 60% by weight iron, cobalt, nickel or alloys thereof.

* * * * *